(12) United States Patent
Zhang et al.

(10) Patent No.: US 8,687,646 B2
(45) Date of Patent: Apr. 1, 2014

(54) METHOD AND APPARATUS FOR BIT AND POWER ALLOCATION, AND COMMUNICATION SYSTEM

(75) Inventors: Huijian Zhang, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 13/114,537

(22) Filed: May 24, 2011

(65) Prior Publication Data

US 2011/0293031 A1   Dec. 1, 2011

(30) Foreign Application Priority Data

May 28, 2010   (CN) .......................... 2010 1 0187416

(51) Int. Cl.
*H04J 3/16* (2006.01)
(52) U.S. Cl.
USPC ........... 370/437; 370/465; 370/472; 370/333; 370/338; 370/329; 375/268; 375/285
(58) Field of Classification Search
USPC .................. 370/333, 318, 335, 336, 329, 338; 375/268, 285
See application file for complete search history.

(56) References Cited

U.S. PATENT DOCUMENTS

| | | | | |
|---|---|---|---|---|
| 2002/0056066 | A1* | 5/2002 | Gesbert et al. | 714/759 |
| 2003/0185311 | A1* | 10/2003 | Kim | 375/260 |
| 2004/0165558 | A1* | 8/2004 | Ling et al. | 370/334 |
| 2005/0018702 | A1* | 1/2005 | Chen et al. | 370/431 |
| 2007/0110176 | A1* | 5/2007 | Wu et al. | 375/260 |
| 2009/0111400 | A1* | 4/2009 | Kazmi et al. | 455/127.1 |

FOREIGN PATENT DOCUMENTS

| | | |
|---|---|---|
| CA | 2533274 A1 | 2/2005 |
| CN | 101304298 A | 11/2008 |
| CN | 101340224 A | 1/2009 |
| CN | 101534138 A | 9/2009 |
| CN | 101547179 A | 9/2009 |

OTHER PUBLICATIONS

Tong Xuejian and Luo Tao, "OFDM mobile communication technology principle and application", People's Posts and Telecom Press, p. 143-144.

(Continued)

*Primary Examiner* — Kibrom T Hailu
*Assistant Examiner* — Zewdu A Beyen
(74) *Attorney, Agent, or Firm* — Staas & Halsey LLP

(57) ABSTRACT

The present invention discloses a method and apparatus for bit and power allocation and a communication system. The method for bit and power allocation comprises: determining a set of candidate modulation modes for sub-channels; constructing an SNR lookup table according to a predetermined target BER, the SNR lookup table containing a relationship of an SNR and the number of bits corresponding to a modulation mode in the set of candidate modulation modes at the target BER; obtaining normalized SNRs on the sub-channels; initializing the numbers of bits for the sub-channels; initializing powers for the sub-channels according to the numbers of bits for the sub-channels, the normalized SNRs on the sub-channels and the SNR lookup table; and adjusting the numbers of bits and the powers for the sub-channels in accordance with a principle of maximizing power utilization rate, to obtain the result of the bit and power allocation for the sub-channels.

20 Claims, 7 Drawing Sheets

(56) References Cited

OTHER PUBLICATIONS

P. S. Chow, J. M. Cioffi and J. A. C. Bingham et al., "A practical discrete multitone transceiver loading algorithm for data transmission over spectrally shaped channels", IEEE Trans. Commun., vol. 43, No. 2, Feb. 1995.

J. M. Cioffi, "Advanced digital communication", pp. 321-325.

John M. Cioffi, "A multicarrier prime", Amati Communications Corporation and Stanford University, pp. 1-18.

Chinese Office Action mailed Jul. 2, 2013 in corresponding Chinese Application No. 201010187416.0.

* cited by examiner

METHOD AND APPARATUS FOR BIT AND POWER ALLOCATION, AND COMMUNICATION SYSTEM

CROSS REFERENCE TO RELATED APPLICATION

This application claims the benefit of Chinese Application No. 201010187416.0, filed May 28, 2010, the disclosure of which is incorporated herein by reference.

FIELD OF THE INVENTION

The present invention generally relates to the communication field, and more particularly to a bit and power allocation method and apparatus for being applied in a parallel communication system with multiple sub-channels, and a communication system.

BACKGROUND OF THE INVENTION

In high speed data transmission systems such as a wireless LAN (WLAN) and various digital subscriber line (xDSL) networks, when a parallel communication mechanism with multiple sub-channels is adopted, it is needed to perform bit and power allocation on the sub-channels appropriately in order to transmit bit streams efficiently with less errors.

At present, bit and power allocation methods based on water-filling principle (see Tong Xuejian and Luo Tao, "OFDM mobile communication technology principle and application", People's Posts and Telecom Press) and bit and power allocation methods derived from water-filling principle with improvements, such as the Chow algorithm (see P. S. Chow, J. M. Cioffi and J. A. C. Bingham et al., "A practical discrete multitone transceiver loading algorithm for data transmission over spectrally shaped channels", IEEE Trans. Commun., Vol. 43, No. 2, February, 1995), an LC algorithm based on a greedy algorithm (see J. M. Cioffi, "Advanced digital communication", course reader [online]. URL: http://www.standford.edu/class/ee379c (accessed finally on May 20, 2010)) and etc., are widely used in multicarrier systems like orthogonal frequency division multiplexing (OFDM), Multiple-Input Multiple-Output-OFDM (MIMO-OFDM), Discrete Multi-Tone (DMT) etc. All these methods use the gap approximation of a QAM modulation format (see John M. Cioffi, "A multicarrier prime" [online]. URL: http://www.stanford.edu/group/cioffi/documents/multicarrier.pdf (accessed finally on May 20, 2010)) and a given symbol error rate (SER) to provide a relation between the power and the number of bits.

There exist two drawbacks in doing so: on one hand, the gap approximation with respect to a square QAM modulation format per se is not accurate enough; and on the other hand, the symbol error rate can not reflect the system performance precisely, while a bit error rate (BER) is the final reflection of the system performance.

SUMMARY OF THE INVENTION

A brief summary of the present invention will be given below, so as to provide a basic understanding regarding some aspects of the present invention. It should be understood that the summary is not an exhausting overview regarding the present invention. It is neither intended to establish the key or critical part of the present invention, nor intended to define the scope of the present invention. It only aims to give some concepts in a simplified form and take them as a preface for a more detailed description to be provided later.

The present invention aims to provide a method and apparatus for bit and power allocation and a communication system, which can at least overcome the above drawbacks in the prior art.

According to one aspect of the present invention, there is provided a method for bit and power allocation, comprising: determining a set of candidate modulation modes for sub-channels; constructing a signal-to-noise ratio (SNR) lookup table according to a predetermined target bit error rate (BER), the SNR lookup table containing a relationship of an SNR and the number of bits corresponding to a modulation mode in the set of candidate modulation modes at the target BER; obtaining normalized SNRs on the sub-channels; initializing the numbers of bits for the sub-channels; initializing powers for the sub-channels according to the numbers of bits for the sub-channels, the normalized SNRs on the sub-channels and the SNR lookup table; and adjusting the numbers of bits and the powers for the sub-channels in accordance with a principle of maximizing power utilization rate, in order to obtain the result of the bit and power allocation for the sub-channels.

According to another aspect of the present invention, there is provided an apparatus for bit and power allocation, comprising: a preprocessor to determine a set of candidate modulation modes for sub-channels, obtain normalized SNRs on the sub-channels, initialize the numbers of bits for the sub-channels, and initialize powers for the sub-channels according to the numbers of bits for the sub-channels, the normalized SNRs on the sub-channels and an SNR lookup table; a lookup table constructor to construct the SNR lookup table according to a predetermined target BER, the SNR lookup table containing a relationship of an SNR and the number of bits corresponding to a modulation mode in the set of candidate modulation modes at the target BER; and a bit and power adjuster to adjust the numbers of bits and the powers for the sub-channels in accordance with a principle of maximizing power utilization rate, in order to obtain the result of the bit and power allocation for the sub-channels.

According to still another aspect of the present invention, there is provided a communication system, comprising: a transmitter to modulate input data onto sub-channels, and transmit the data to a receiver via the sub-channels; the receiver to demodulate the sub-channels to obtain the data, and perform channel estimation on the sub-channels; and a bit and power allocator to perform bit and power allocation for the sub-channels according to a result of the channel estimation and transmit a result of the allocation to the transmitter, wherein the bit and power allocator is the above mentioned bit and power allocator.

In addition, according to other aspects of the present invention, there are provided a corresponding computer readable storage medium and a corresponding computer program product.

These and other advantages of the present invention will become more apparent from the following detailed description of preferred embodiments of the present invention in conjunction with accompanying drawings.

BRIEF DESCRIPTIONS OF THE DRAWINGS

The above and other objects, features and advantages of the present invention will be understood more readily with reference to the following description of the embodiments of the present invention in conjunction with the accompanying drawings. The parts in the drawings are only to show the principle of the present invention. In the drawings, similar or identical technical features or parts will be denoted with similar or identical reference signs.

DETAILED DESCRIPTIONS OF THE EMBODIMENTS

Figure 1:
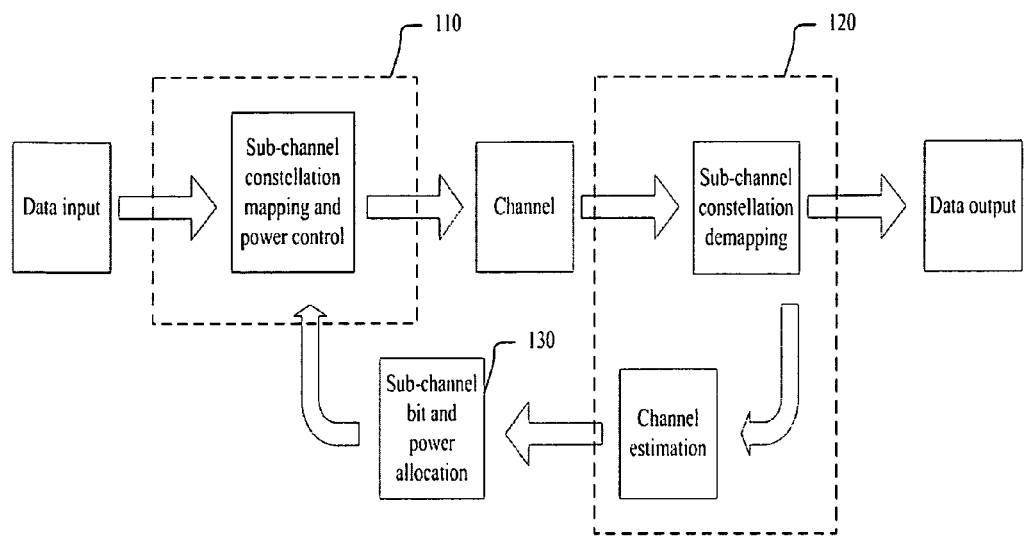
FIG. 1 shows a schematic block diagram of a system for performing parallel communication with multiple sub-channels.

The embodiments of the present invention will be described below with reference to the drawings. Elements and features described in a figure or an embodiment of the present invention may be combined with the elements and features shown in one or more other figures or embodiments. It is to be noted that, for the purpose of clarity, representations and descriptions of elements and processing which are known to those skilled in the art or are not related to the present invention, are omitted in the drawings and the description.

FIG. 1 is a schematic block diagram of a system for performing parallel communication with multiple sub-channels. Usually, in a parallel communication system with multiple sub-channels, as shown in FIG. 1, in a transmitter 110, input data are modulated onto the sub-channels respectively by a sub-channel constellation mapping and power controller. The data are then transmitted to a receiver 120 via the sub-channels. In the receiver 120, a sub-channel constellation demapping unit demodulates the sub-channels respectively, thereby recovering the transmitted data. In addition, in the process of sub-channel demodulation, a channel estimator in the receiver 120 can perform channel estimation to obtain normalized signal-noise ratios (SNRs) of the sub-channels (i.e., SNRs when a transmission power is of a unit value). The channel estimation can be implemented through transmitting a training sequence, and can also be implemented in a decision-aided way. A sub-channel bit and power allocator 130 optimizes and configures bits of and powers for the sub-channels according to the result of the channel estimation by using a specific bit and power allocation method, and informs the sub-channel constellation mapping and power controller in the transmitter 110 of the allocation result. The transmitter 110 will perform constellation mapping and power control on the sub-channels by using the allocation result. Usually, the sub-channel bit and power allocator 130 can be provided in the transmitter 110 or the receiver 120, and can also be provided individually as a separate apparatus.

In the system 100 shown in FIG. 1, the specific implementations of the sub-channel constellation mapping and power controller and the sub-channel constellation demapping unit depend on the adopted modulation technique, which can be not only multicarrier technique such as OFDM, DMT, Frequency Division Multiplexing (FDM) or etc, but also space division multiplexing technique such as MIMO or polarization multiplexing, or a combination of multiple techniques such as MIMO-OFDM technique. The common characteristic of these techniques lies in that, after processes such as demodulation and equalization in the receiver, the sub-channels can be logically approximated as Gaussian channels for independent transmission (with little interference).

In the present invention, an improved design is made for the sub-channel bit and power allocator 130 in FIG. 1 and the operation method thereof, so as to at least overcome the above drawbacks in the prior art. In the bit and power allocation method and apparatus of the present invention, in order to reflect the performance of the system precisely, an SNR lookup table is constructed according to a predetermined target BER, and at least powers for the sub-channels are initialized based on the SNR lookup table.

Figure 2:
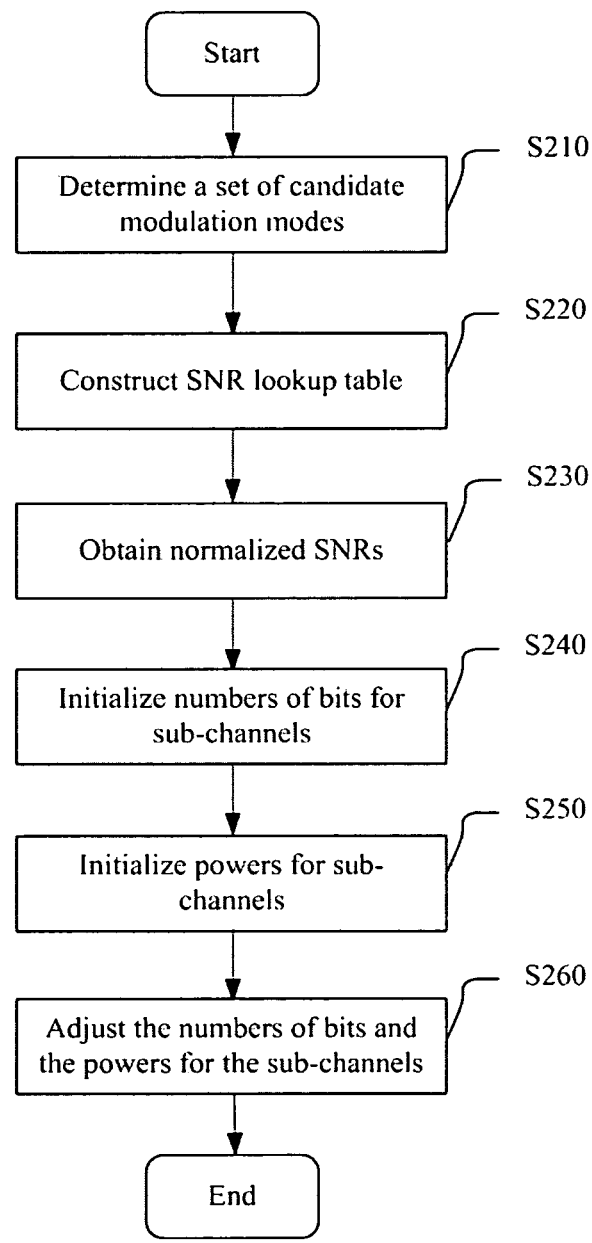
FIG. 2 shows a flowchart of a method for bit and power allocation according to an embodiment of the present invention.

FIG. 2 shows a flowchart of a method for bit and power allocation according to an embodiment of the present invention. As shown in FIG. 2, in step S210, a set of candidate modulation modes for sub-channels is determined.

In the method for bit and power allocation of the present invention, there is no limitation to the modulation modes of the sub-channels. However, for the illustration purpose, the method according to the present invention will be described below by using M-ary quadrature amplitude modulation (M-QAM) and M-ary phase shift keying (M-PSK) as exemplary modulation modes.

It is assumed that the system has N sub-channels, the numbers of bits to be loaded on sub-channels are ($b_1, b_2, \ldots, b_N$) respectively. The number of bits to be transmitted on each channel can be selected from a set of $\{0, a_1, a_2, \ldots, a_L, a_i < a_{i+1}, a_i \text{ is a positive integer}\}$, where $a_L$ is the maximum number of bits allowed to transmitted, and 0 indicates that the sub-channel is not available. In the case that an M-QAM modulation mode is used, the above mentioned set of numbers of bits correspond to a set of modulation modes $\{0, 2^{a_1}\text{-QAM}, 2^{a_2}\text{-QAM}, \ldots, 2^{a_L}\text{-QAM}\}$. In the case that an M-PSK modulation mode is used, the above mentioned set of numbers of bits correspond to a set of modulation modes $\{0, 2^{a_1}\text{-PSK}, 2^{a_2}\text{-PSK}, \ldots, 2^{a_L}\text{-PSK}\}$. Usually, $\{a_1, a_2, \ldots, a_L\} = \{1, 2, \ldots, L\}$ or $\{2, 4, \ldots, 2L\}$. Likewise, after the set of candidate modulation modes for the sub-channels is determined, the numbers of bits corresponding to the modulation modes in the set of candidate modulation modes can be obtained correspondingly. For example, $2^{a_1}\text{-QAM}$ corresponds to $a_1$ bits. That is to say, there are $2^{a_1}$ constellation points in $2^{a_1}\text{-QAM}$ modulation mode, and accordingly $a_1$ bits are needed for transmitting the values of the $2^{a_1}$ constellation points.

In the above example, the sub-channels can use the same modulation mode. However, in other embodiments, the sub-channels can also use different modulation modes, as long as it is ensured that there is no duplication in the numbers of bits corresponding to the modulation modes in the set of candidate modulation modes.

In step S220, an SNR lookup table is constructed according to a predetermined target BER. The SNR lookup table contains a relationship between an SNR and the number of bits corresponding to a modulation mode in the set of candidate modulation modes at the target BER.

The elements in the table, i.e., the SNRs, can be calculated by using an existing precise BER formulas in the prior art. For example, the elements in the SNR lookup table can be calculated by using formula (10) in the specification of patent document CN101304298A. The relation between a BER and a Signal to Interference plus Noise Ratio (SINR) is provided in the formula (10) of the patent document. The elements in the SNR lookup table can also be calculated by using the formula in line 4 form the bottom of page 5 of the specification of patent document CN101340224A. The formula provides a relation between a power and the BER, and the relation between an SNR and the BER can be obtained by moving $N_0$ on the right side of the formula to the left side of the formula.

The following Table 1 provides an example of an SNR lookup table under the M-QAM modulation mode, taking 1024-QAM as the maximum constellation for example. There are provided in the table the correspondence relations between the numbers of bits and SNRs at several common target bit error rates $BERs_{target}$, respectively. In Table 1, for the convenience of subsequent calculations, in addition to the SNRs corresponding to the numbers of bits, SNR increments $\Delta SNRs$ are also provided. At the same target BER, the $\Delta SNR$ in each line is the difference between the SNR in the line and the SNR in the immediate previous line.

In addition to the BER formulas in the prior art, for the M-QAM modulation mode, the elements in the SNR lookup table can be also calculated by using the following BER formulas:

$SNR = [erfc^{-1}(2BER_{target})]^2$, when the number of bits $a=1$; and $$SNR = (3+\sqrt{3})\left[erfc^{-1}\left(\frac{16}{11}BER_{target}\right)\right]^2 \text{ or}$$

$$SNR = 6\left[erfc^{-1}\left(\frac{12}{5}BER_{target}\right)\right]^2,$$

when $a=3$.

When the number of bits is other value, the elements in the SNR lookup table can be calculated by using the following general formulas:

$$SNR = \left(\frac{31}{48}2^{2p+1} - \frac{2}{3}\right)\left[erfc^{-1}\left(\frac{2^{p+1}(2p+1)}{2(2^{p+1}-1)}BER_{target}\right)\right]^2$$

when the number of bits $a=2p+1$, p is a positive integer and $p \geq 2$; and $$SNR = \frac{2}{3}(2^{2p}-1)\left[erfc^{-1}\left(\frac{2^{p+1}p}{2(2^p-1)}BER_{target}\right)\right]^2,$$

when $a=2p$ and p is a positive integer.

In the above formulas, $BER_{target}$ is a predetermined target BER.

The following Table 2 provides an example of an SNR lookup table under the M-PSK modulation mode, taking 1024-PSK as a maximum constellation for example. There are provided in the table the correspondence relations between the numbers of bits and SNRs at several common target bit error rates $BER_{target}$, respectively. Similarly, in Table 2, for the convenience of subsequent calculations, in addition to SNRs corresponding to the numbers of bits, SNR increments $\Delta SNRs$ are also provided. At the same target BER, the $\Delta SNR$ in each line is the difference between the SNR in the line and the SNR in the immediate previous line.

TABLE 1

| | symbol | | | | | | | |
|---|---|---|---|---|---|---|---|---|
| | $BER_{target}$ = 1e-3 | | $BER_{target}$ = 1e-4 | | $BER_{target}$ = 1e-5 | | $BER_{target}$ = 1e-6 | |
| bit | SNR | $\Delta$SNR | SNR | $\Delta$SNR | SNR | $\Delta$SNR | SNR | $\Delta$SNR |
| 0 | 0 | 0 | 0 | 0 | 0 | 0 | 0 | 0 |
| 1 | 4.77 | 4.77 | 6.92 | 6.92 | 9.09 | 9.09 | 11.30 | 11.30 |
| 2 | 9.55 | 4.77 | 13.83 | 6.92 | 18.19 | 9.09 | 22.60 | 11.30 |
| 3 | 23.98 | 14.43 | 34.14 | 20.31 | 44.47 | 26.28 | 54.91 | 32.31 |
| 4 | 45.11 | 21.13 | 66.46 | 32.31 | 88.21 | 43.74 | 110.21 | 55.30 |
| 5 | 88.97 | 43.85 | 131.62 | 65.16 | 175.11 | 86.90 | 219.10 | 108.89 |
| 6 | 179.85 | 90.88 | 269.23 | 137.61 | 360.45 | 185.34 | 452.77 | 233.67 |
| 7 | 344.78 | 164.93 | 519.11 | 249.88 | 697.10 | 336.65 | 877.28 | 424.51 |
| 8 | 694.17 | 349.39 | 1054.99 | 535.88 | 1423.66 | 726.56 | 1797.00 | 919.72 |
| 9 | 1322.09 | 627.92 | 2021.74 | 966.75 | 2736.97 | 1313.31 | 3461.42 | 1664.42 |
| 10 | 2667.32 | 1345.23 | 4111.26 | 2089.52 | 5588.28 | 2851.32 | 7084.78 | 3623.36 |

TABLE 2

| | symbol | | | | | |
|---|---|---|---|---|---|---|
| | $BER_{target}$ = 1e−3 | | $BER_{target}$ = 1e−4 | | $BER_{target}$ = 1e−5 | |
| bit | SNR | ΔSNR | SNR | ΔSNR | SNR | ΔSNR |
| 0 | 0 | 0 | 0 | 0 | 0 | 0 |
| 1 | 4.77 | 4.77 | 6.92 | 6.92 | 9.09 | 9.09 |
| 2 | 9.55 | 4.77 | 13.83 | 6.92 | 18.19 | 9.09 |
| 3 | 30.07 | 20.52 | 44.63 | 30.79 | 59.47 | 41.28 |
| 4 | 108.83 | 78.75 | 164.64 | 120.01 | 221.64 | 162.17 |
| 5 | 410.07 | 301.25 | 630.54 | 465.90 | 856.02 | 634.38 |
| 6 | 1567.99 | 1157.92 | 2445.55 | 1815.01 | 3344.08 | 2488.06 |
| 7 | 6037.94 | 4469.95 | 9538.26 | 7092.71 | 13126.01 | 9781.93 |
| 8 | 23352.96 | 17315.01 | 37323.81 | 27785.55 | 51657.56 | 38531.56 |
| 9 | 90610.80 | 67257.85 | 146388.16 | 109064.35 | 203666.21 | 152008.64 |
| 10 | 352456.64 | 261845.83 | 575178.15 | 428789.99 | 804086.72 | 600420.51 |

In addition to the BER formulas in the prior art, for the M-PSK modulation mode, the elements in the SNR lookup table can also be calculated by using the following BER formulas:

$$SNR = [erfc^{-1}(2BER_{target})]^2, \text{ when the number of bits } a=1;$$

$$SNR = 2[erfc^{-1}(2BER_{target})]^2, \text{ when a=2; and}$$

$$SNR = \left[ erfc^{-1}(pBER_{target}) / \sin\left(\frac{\pi}{2p}\right) \right]^2,$$

when a=p, p is a positive integer and P≥3.

In the above formulas, $BER_{target}$ is a predetermined target BER.

Still refer to FIG. 2, in step S230, normalized SNRs ($g_1$, $g_2$, ..., $g_N$) on the sub-channels are obtained. As mentioned above, the normalized SNRs on the sub-channels, i.e., the SNRs when the sub-channels each transmit a unit power, can be measured through channel estimation of the receiver in the communication system or be measured through other existing approaches.

In step S240, the numbers of bits ($b_1$, $b_2$, ..., $b_N$) for the sub-channels are initialized. The initialization of the numbers of bits can be implemented in various known ways. For example, the numbers of bits can be selected randomly from a set of numbers of bits {0, $a_1$, $a_2$, ..., $a_L$} corresponding to the set of candidate modulation modes {0, $2^{a_1}$-QAM, $2^{a_2}$-QAM}, ..., $2^{a_L}$-QAM) determined in step S210. Alternatively, the numbers of bits for the sub-channels can all be assumed as 0.

In step S250, the powers for the sub-channels are initialized. The powers for the sub-channels can be initialized according to the numbers of bits ($b_1$, $b_2$, ..., $b_N$) for the sub-channels, the normalized SNRs ($g_1$, $g_2$, ..., $g_N$) for the sub-channels and the SNR lookup table. Specifically, the SNR lookup table such as Table 1 is looked up according to the numbers of bits ($b_1$, $b_2$, ..., $b_N$) (if the M-PSK modulation mode is used, a table such as Table 2 can be looked up), to obtain an SNR($b_k$) corresponding to the number of bits $b_k$ for sub-channel k (1≤k≤N) as the SNR on sub-channel k. Then, the power for sub-channel k can be calculated by using the following formula:

$$P_k(b_k) = SNR(b_k) \cdot \gamma / g_k,$$

where $g_k$ is the normalized SNR on sub-channel k, and γ is a predetermined power margin.

After the initialization of the numbers of bits and the powers, the numbers of bits and the powers for the sub-channels can be adjusted in step S260 in accordance with a principle of maximizing power utilization rate, in order to obtain a final allocation result. Various known algorithms such as rate adaptive algorithm or margin adaptive algorithm can be used to adjust the numbers of bits and the powers for the sub-channels in an iterative manner. In the case that that the initial values of the numbers of bits and the powers for the sub-channels are given, those skilled in the art can understand how to use an existing algorithm to adjust the numbers of bits and the powers for the sub-channels in accordance with a principle of maximizing power utilization rate, which will not be detailed here.

In the above method, the use of the SNR lookup table constructed according to the target BER enables the initialized powers relatively accurate, and thus it is possible to reduce the number of times the iteration is performed in the adjustment of the numbers of bits and the powers. In addition, since the SNR lookup table is constructed in advance, the calculation load for the subsequent adjustment of the numbers of bits and the powers can be decreased.

Figure 3:
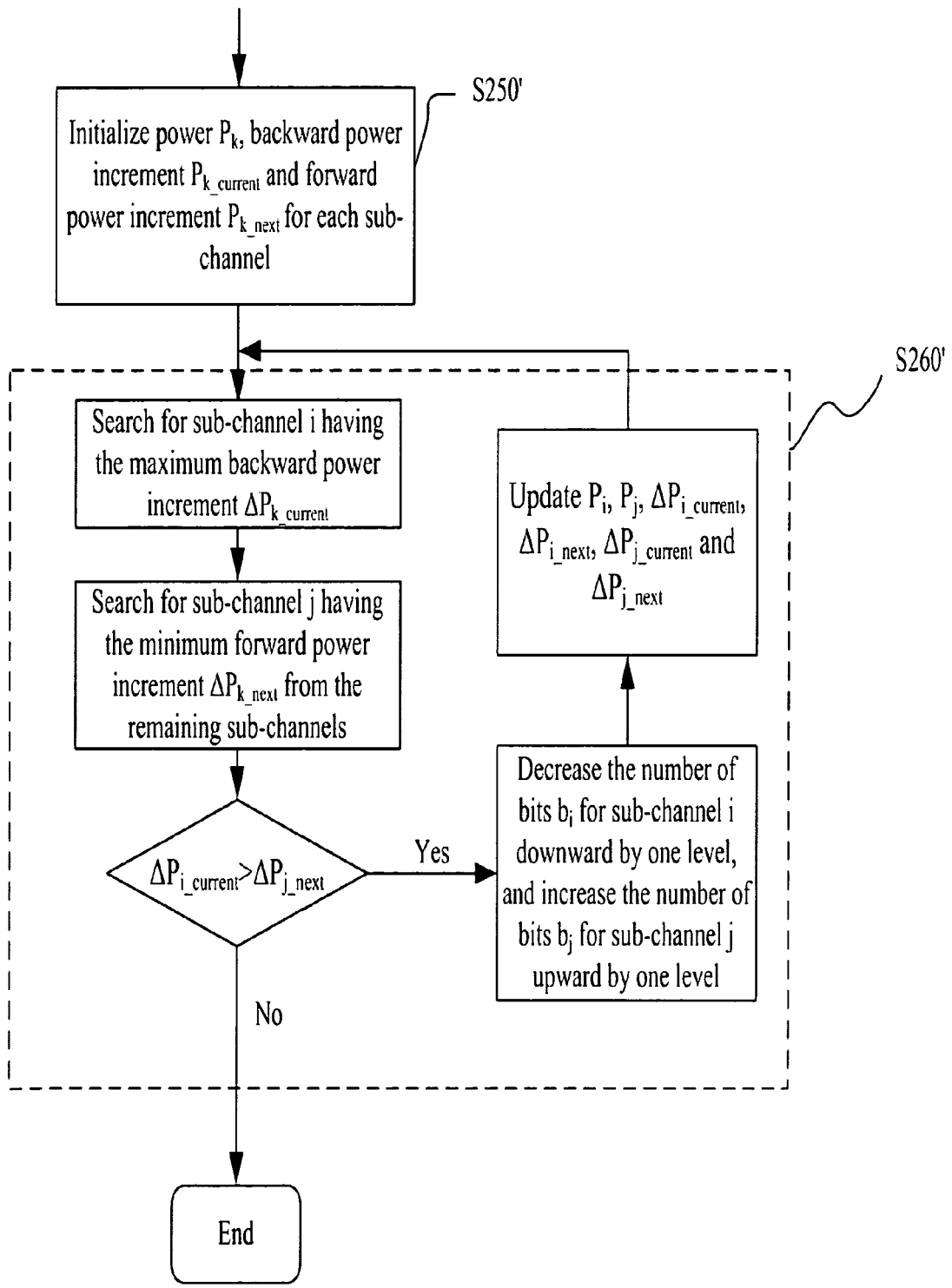
FIG. 3 shows a flowchart of initializing sub-channel power and adjusting sub-channel bit number and power according to an embodiment of the present invention.

Hereinafter, the adjustment of the numbers of bits and the powers according to an embodiment of the present invention will be described in conjunction with FIGS. 3-5. FIG. 3 shows a flowchart of initializing sub-channel power and adjusting sub-channel bit number and power according to an embodiment of the present invention.

In order to implement the adjustment of the numbers of bits and the powers according to the embodiment of the present invention, first, in initializing the powers of sub-channels, in addition to initializing the powers ($P_1$, $P_2$, ..., $P_N$) for the sub-channels, backward power increments ($\Delta P_{1\_current}$, $\Delta P_{2\_current}$, ..., $\Delta P_{N\_current}$) and forward power increments ($\Delta P_{1\_next}$, $\Delta P_{2\_next}$, ..., $\Delta P_{N\_next}$) for the sub-channels are also initialized, as shown in step S250' in FIG. 3. Here, a backward power increment indicates the amount by which the current power for a sub-channel is to be decreased when the next lower level of number of bits than the current number of bits for the sub-channel is allocated to the sub-channel, and a forward power increment indicates the amount by which the current power for a sub-channel is to be increased when the next higher level of number of bits than the current number of bits for the sub-channel is allocated to the sub-channel.

Specifically, for a sub-channel k, 1≤k≤N, its backward power increment is $\Delta P_{k\_current} = P_k(b_k) - P_k$ (the number of bits which is one level lower than $b_k$), and the forward power increment is $\Delta P_{k\_next} = P_k$ (the number of bits which is one level higher than $b_k$) − $P_k(b_k)$. If $b_k$=0, then $P_k$=0, $\Delta P_{k\_current}=0$, $\Delta P_{k\_next}=P_k(a_1)$. If $b_k=a_L$, then $\Delta P_{k\_next}=+\infty$. $a_1$ is the number of bits corresponding to the lowest level non-zero modulation mode in the set of candidate modulation modes, $a_L$ is the highest level modulation mode in the set of candidate modulation modes.

The forward power increment and the backward power increment can be obtained by looking up the SNR lookup table. $\Delta SNR(b_k)$ and $\Delta SNR$ (the number of bits which is one level higher than $b_k$) are obtained by looking up the SNR lookup table, then $\Delta P_{k\_current}=\Delta SNR(b_k)/(\gamma g_k)$ and $\Delta P_{k\_next}=\Delta SNR$ (the number of bits which is one level higher than $b_k$)/$(\gamma g_k)$ are calculated. Here, $g_k$ is the normalized SNR on the sub-channel k, and $\gamma$ is a predetermined power margin.

It should be understood that, for the number of bits or a modulation mode, the higher the number of bits is, or the more the constellation points in the modulation mode are, then the higher the level of the number of bits or the modulation mode is. For example, for 2-QAM, 4-QAM and 8-QAM modulation modes, their corresponding numbers of bits are 1, 2 and 3, respectively, and the levels of the modulation modes and the numbers of bits are from low to high in this order.

Still refer to FIG. 3, in step S260', 1) sub-channel i which has the maximum backward power increment is searched for from the sub-channels;

2) sub-channel j (j≠i) having the minimum forward power increment is searched for from the sub-channels other than sub-channel i;

3) if $\Delta P_{i\_current}>\Delta P_{j\_next}$, which indicates that the current allocation of the numbers of bits for the sub-channels results in a low power utilization rate, then the number for bits of sub-channel i is decreased by one level, and the number of bits for sub-channel j is increased by one level, the powers $P_i$, $P_j$, the backward power increments $P_{i\_current}$, $P_{j\_current}$, and the forward power increments $P_{i\_next}$, $P_{j\_next}$ for the two sub-channels are updated, and it is continued to execute the adjusting step S260', that is, step S260' is executed again;

4) if $\Delta P_{i\_current}\leq\Delta P_{j\_next}$, then it can be considered that the current allocation of the numbers of bits for the sub-channels results in a high power utilization rate, so the adjusting step S260' can be ended.

In addition, although it indicates that the current allocation of the numbers of bits for the sub-channels results in a high power utilization rate when $\Delta P_{i\_current}\leq\Delta P_{j\_next}$ and the current numbers of bits and powers can be used as the final allocation result, it is possible that a predetermined total power or a predetermined capacity of the system is not reached yet or has been exceeded. In order to allocate the predetermined total power or predetermined capacity of the system to the sub-channels exactly, according to an embodiment of the present invention, when $\Delta P_{i\_current}\leq\Delta P_{j\_next}$, the adjusting step will not be ended, but instead, the numbers of bits and the powers for the sub-channels will be finely tuned.

Figure 4:
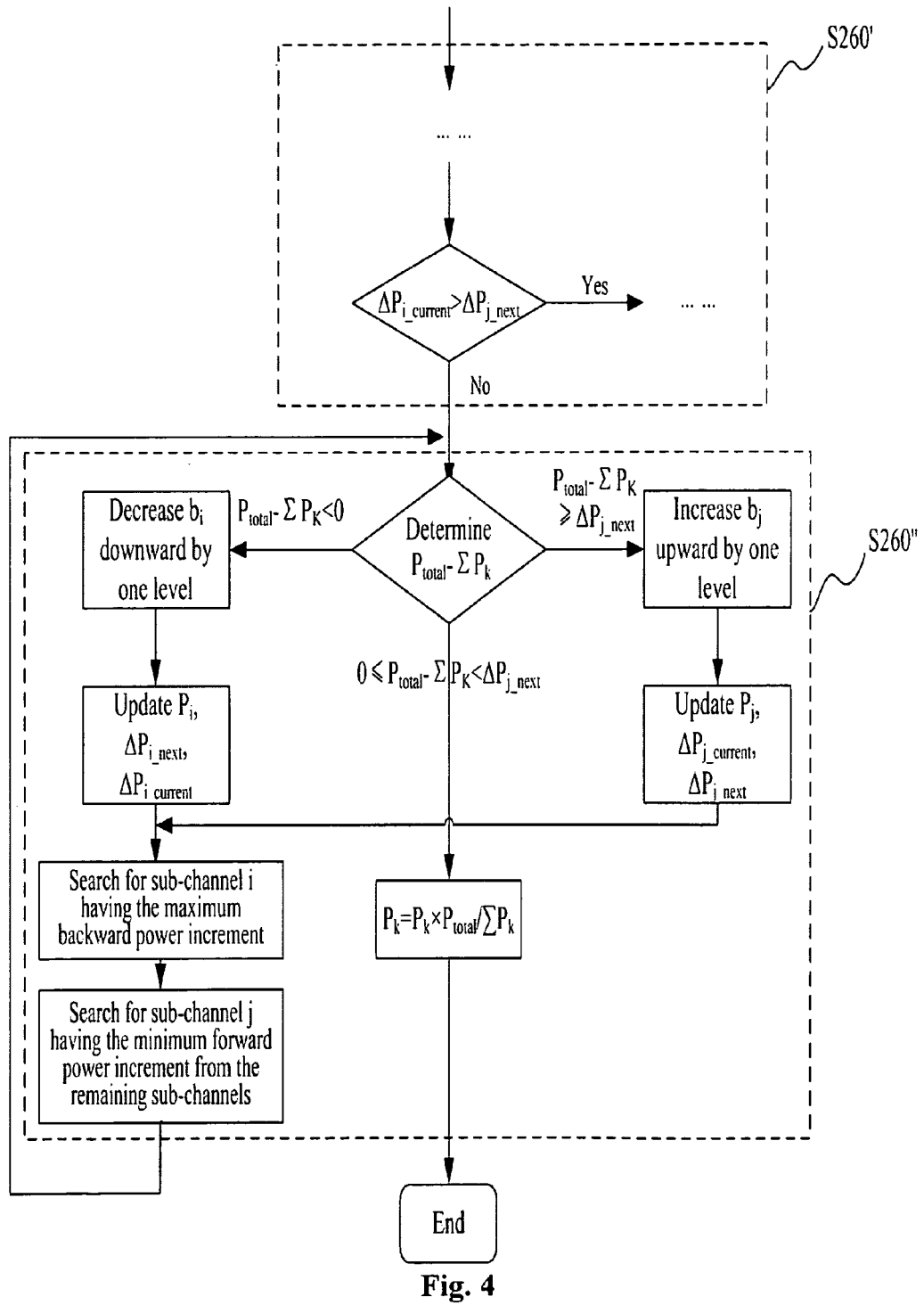
FIG. 4 shows a flowchart of adjusting sub-channel bit number and power according to another embodiment of the present invention.

FIG. 4 shows a flowchart of adjusting sub-channel bit number and power according to another embodiment of the present invention. In the adjusting process as shown in FIG. 4, a finely tuning step S260" is added on the basis of the adjusting process S260' shown in FIG. 3. As shown in FIG. 4, when $\Delta P_{i\_current}\leq\Delta P_{j\_next}$, the finely tuning step S260" is executed. The embodiment shown in FIG. 4 is in the case when the predetermined total power of the system is given. When the predetermined total power of the system is given, it is needed to make the capacity of the system as large as possible, that is, make the sum of the numbers of bits allocated to the sub-channels as large as possible.

In the finely tuning step S260", the relation between the sum $\Sigma P_k$ (1≤k≤N) of the powers for all the sub-channels and the predetermined total power of the system $P_{total}$ is determined.

If the sum $\Sigma P_k$ of the powers for all the sub-channels goes beyond the predetermined total power $P_{total}$, i.e., $P_{total}-\Sigma P_k<0$, which indicates that excessive powers are allocated to the sub-channels, then the number of bits for sub-channel i which has the maximum backward power increment is decreased by one level, the power $P_i$, the backward power increment $\Delta P_{i\_current}$ and the forward power increment $\Delta P_{i\_next}$ for sub-channel i are updated, a sub-channel i which has the maximum backward power increment is searched for, a sub-channel j which has the minimum forward power increment is searched for from the sub-channels other than sub-channel i, and it is continued to execute the finely tuning step S260", that is, step S260" is executed again.

If the sum $\Sigma P_k$ of the powers for all the sub-channels does not go beyond the predetermined total power $P_{total}$ and the difference between the predetermined total power and the sum is larger than or equal to the minimum forward power increment $\Delta P_{j\_next}$ among the sub-channels, i.e., $P_{total}-\Sigma P_k\geq\Delta P_{j\_next}$, which indicates that there is still some predetermined total power remaining which can be allocated, then the number of bits for sub-channel j is increased by one level, the power $P_j$, the backward power increment $\Delta P_{i\_current}$ and the forward power increment $\Delta P_{j\_next}$ for sub-channel j are updated, a sub-channel i which has the maximum backward power increment is searched for, a sub-channel j which has the minimum forward power increment is searched for from the sub-channels other than sub-channel i, and it is continued to execute the finely tuning step S260", that is, step S260" is executed again.

If the sum $\Sigma P_k$ of the powers for all the sub-channels does not go beyond the predetermined total power $P_{total}$ and the difference between the predetermined total power and the sum is less than the minimum forward power increment $\Delta P_{j\_next}$ among the sub-channels, i.e., $0\leq P_{total}-\Sigma P_k<\Delta P_{j\_next}$, which indicates that there is still some predetermined total power remaining that is not enough to be allocated however, then the remaining power is shared by the sub-channels. Specifically, the powers of the sub-channels are increased by a multiple equal to the ratio of the predetermined total power $P_{total}$ and the sum $\Sigma P_k$ of the powers for all the sub-channels, i.e., the power of sub-channel k (1≤k≤N) is changed into $P_k P_k \times P_{total}/\Sigma P_k$, and step S260" is ended.

Figure 5:
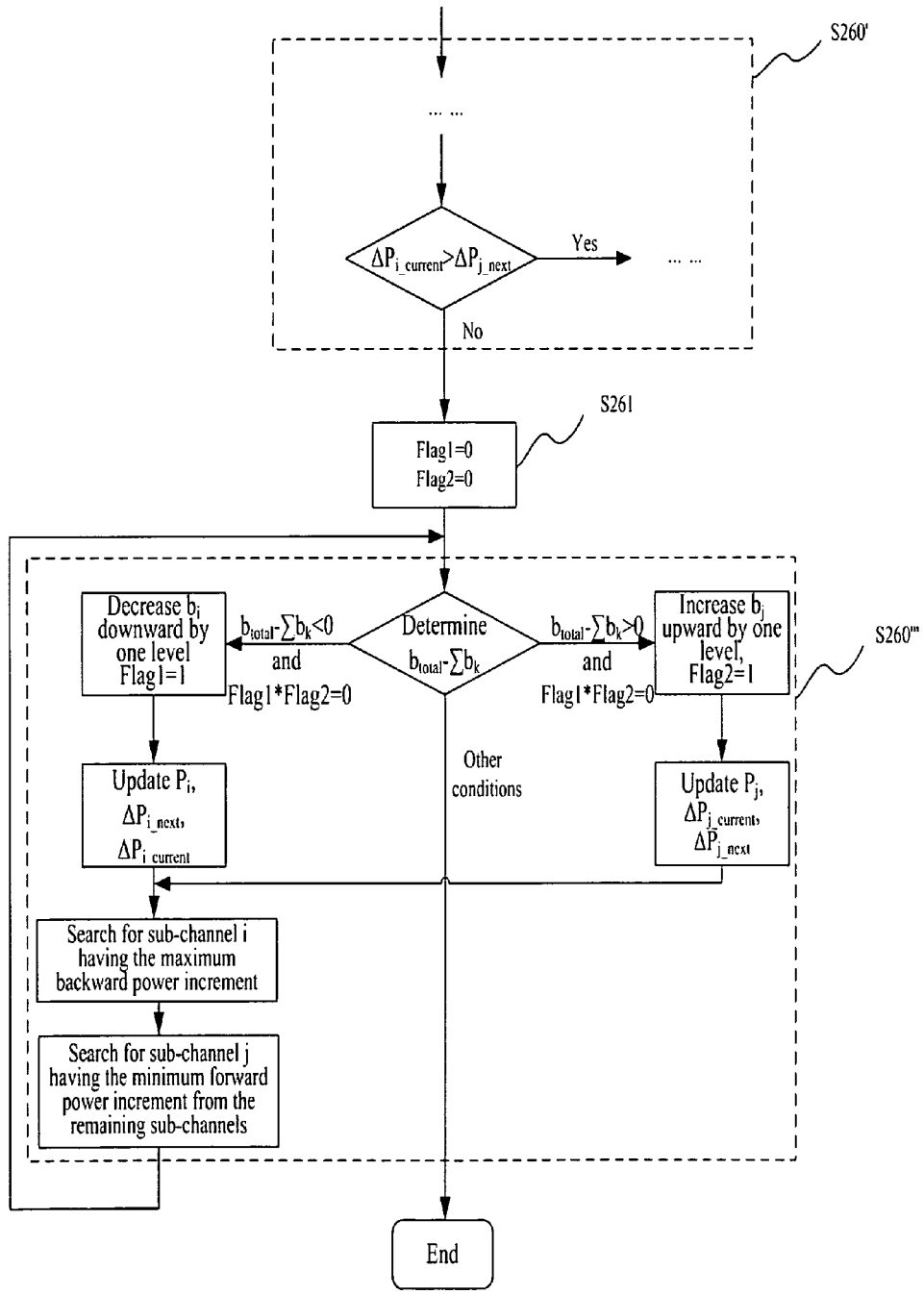
FIG. 5 shows a flowchart of adjusting sub-channel bit number and power according to still another embodiment of the present invention.

FIG. 5 shows a flowchart of adjusting sub-channel bit number and power according to still another embodiment of the present invention. In the adjusting process as shown in FIG. 5, a finely tuning step S260''' is added on the basis of the adjusting process S260''' shown in FIG. 3. As shown in FIG. 5, when $\Delta P_{i\_current}\leq\Delta P_{j\_next}$, the finely tuning step S260''' is executed. The embodiment shown in FIG. 5 is in the case when the predetermined capacity of the system is given. When the predetermined capacity of the system is given, that is, the total number of bits to be allocated to the sub-channels is given, it is needed to make the total power of the system as low as possible, that is, make the sum of the powers allocated to the sub-channels as low as possible.

In the finely tuning step S260''', the relation between the sum $\Sigma b_k$ (1≤k≤N) of the numbers of bits for all the sub-channels and the predetermined total number of bits for the system $b_{total}$ is determined.

If the sum $\Sigma b_k$ of the numbers of bits for all the sub-channels goes beyond the predetermined total number of bits $b_{total}$, i.e., $b_{total}-\Sigma b_k<0$, which indicates that excessive numbers of bits are allocated to the sub-channels, then the number of bits for sub-channel i which has the maximum backward power increment is decreased by one level, the power $P_i$, the backward power increment $\Delta P_{i\_current}$ and the forward power increment $\Delta P_{i\_next}$ for the sub-channel i are updated, a sub-channel i which has the maximum backward power increment is searched for, a sub-channel j which has the minimum forward power increment is searched for from the sub-channels other than the sub-channel i, and it is continued to execute the finely tuning step S260''', that is, step S260''' is executed again.

If the sum $\Sigma b_k$ of the numbers of bits for all the sub-channels is lower than the predetermined total number of bits $b_{total}$, i.e., $b_{total} - \Sigma b_k > 0$, which indicates that there is some capacity remaining, then the number of bits for sub-channel j which has the minimum forward power increment is increased by one level, the power $P_j$, the backward power increment $\Delta P_{j\_current}$ and the forward power increment $\Delta P_{j\_next}$ for sub-channel j are updated, a sub-channel i which has the maximum backward power increment is searched for, a sub-channel j which has the minimum forward power increment is searched for from the sub-channels other than the sub-channel i, and it is continued to execute the finely tuning step S260''', that is, step S260''' is executed again.

In order prevent infinite loops from occurring in the finely tuning process when the remaining capacity is not enough to increase the number of bits of sub-channel j by one level, two identifiers can be introduced here. First, before the execution of the finely tuning step S260''', in step S261, identifiers Flag1 and Flag2 are set as 0, respectively. Only when it is determined that $b_{total} - \Sigma b_k < 0$ and Flag1*Flag2=0, the operation for decreasing $b_i$ by one level will be executed and Flag1 is set as 1. Only when it is determined that $b_{total} - \Sigma b_k > 0$ and Flag1*Flag2=0, the operation for increasing $b_j$ by one level is executed and Flag2 is set as 1. Thus, after both the level decreasing operation and the level increasing operation are executed once, the finely tuning operation is ended no matter whether there is some system capacity remaining or the system capacity is allocated excessively, thus preventing infinite loops from occurring.

In step S240 shown in FIG. 2, in addition to the existing method for initializing the numbers of bits, a new method for initializing the numbers of bits to be described below can also be used to make the initialized numbers of bits relatively more accurate, thus further reducing the number of times of the subsequent iteration. The method for initializing the numbers of bits according to an embodiment of the present invention will be described below with respect to two cases.

(The initialization of the numbers of bits in the case that the total power is given)

It is assumed that the transmission powers allocated to the sub-channels are ($P_1, P_2, \ldots, P_N$), and the numbers of bits allocated to the sub-channels are ($b_1, b_2, \ldots, b_N$). When the predetermined total power $P_{total}$ of the system is given, an optimization target function for maximizing system is:

$$\max \cdot \sum_{k=1}^{N} b_k \text{ s.t.} \sum_{k=1}^{N} P_k = P_{total}, \tag{1}$$

where k is the number of a sub-channel and $1 \leq k \leq N$, and N is the total number of the sub-channels. That is to say, when the total power is given, it is to maximize the system capacity.

For an M-QAM modulation mode, the bit error rate BER, the power $P_k$ and the number of bits $b_k$ meet the following relation:

$$BER \approx \frac{2}{b} \text{erfc}\left(\sqrt{\frac{1.5 P_k g_k}{2^{b_k} - 1}}\right), \tag{2}$$

where $g_k$ is the normalized SNR on sub-channel k.

It is assumed that the predetermined target BER of the system is $BER_{target}$, and the power margin of the system is $\gamma$ (which here is a margin with a linear unit; and if a margin $\gamma\_dB$ with dB as the unit is given, then $\gamma=10^{\wedge}(\gamma\_dB/10)$). From the above formula (2), the relation between $P_k$ and $b_k$ is obtained as:

$$P_k = \frac{[\text{erfc}^{-1}(BER_{target} b_k/2)]^2 \gamma (2^{b_k} - 1)}{1.5 g_k} \approx \frac{B\gamma(2^{b_k} - 1)}{1.5 g_k}, \tag{3}$$

where B can take a conservative estimation value $[\text{erfc}^{-1}(BER_{target} a_1/2)]^2$, or a value that is first squared and then averaged $$\frac{1}{L}\sum_{k=1}^{L} [\text{erfc}^{-1}(BER_{target} a_k/2)]^2,$$

or a value that is first averaged and then squared $$\left[\frac{1}{L}\sum_{k=1}^{L} \text{erfc}^{-1}(BER_{target} a_k/2)\right]^2,$$

and so on. Here $a_1$ is the number of bits corresponding to the lowest level non-zero modulation mode in the set of candidate modulation modes, $a_k$ is the number of bits corresponding to the $k^{th}$ non-zero modulation mode when the modulation modes in the set of candidate modulation modes are arranged in an ascending order, and L is the total number of the non-zero modulation modes in the set of candidate modulation modes.

By substituting formula (3) into the optimization target function (1) and using Lagrange multiplication, an optimal bit configuration can be derived:

$$b_k = \log_2\left(\frac{1.5 g_k P_{total}}{B\gamma N} + \frac{g_k}{N}\sum_{n=1}^{N}\frac{1}{g_n}\right). \tag{4}$$

Estimation values of the numbers of bits for the sub-channels of the M-QAM modulation mode can be calculated according to the above formula (4).

An estimation value $b_k$ is quantized to a set of numbers of bits $\{0, a_1, a_2, \ldots, a_L\}$ corresponding to the set of candidate modulation modes, to obtain the numbers of bits for the sub-channels. The estimation values of the numbers of bits for the sub-channels can be quantized in various ways such as rounding off, rounding up and rounding down without limitation.

For an M-PSK modulation mode, the bit error rate BER, the power $P_k$ and the number of bits $b_k$ meet the following relation:

$$BER \approx \frac{1}{b}\text{erfc}\left(\sqrt{P_k g_k}\sin\left(\frac{\pi}{2^{b_k}}\right)\right), \quad (2')$$

where $g_k$ is the normalized SNR on sub-channel k.

It is assumed that the predetermined target bit error rate of the system is $BER_{target}$, and the power margin is γ (which here is a margin with a linear unit). The relation between $P_k$ and $b_k$ can be obtained from the above formula (2'):

$$P_k = \frac{[\text{erfc}^{-1}(BER_{target} b_k)]^2 \gamma}{g_k \sin^2\left(\frac{\pi}{2^{b_k}}\right)} \approx \frac{B\gamma 2^{2b_k}}{\pi^2 g_k}, \quad (3')$$

where B can take a conservative estimation value $[\text{erfc}^{-1}(BER_{target} a_1)]^2$, or a value that is first squared and then averaged $$\frac{1}{L}\sum_{k=1}^{L}[\text{erfc}^{-1}(BER_{target} a_k)]^2,$$

or a value that is first averaged and then squared $$\left[\frac{1}{L}\sum_{k=1}^{L}\text{erfc}^{-1}(BER_{target} a_k)\right]^2,$$

and so on. Here $a_1$ is the number of bits corresponding to the lowest level non-zero modulation mode in the set of candidate modulation modes, $a_k$ is the number of bits corresponding to the $k^{th}$ non-zero modulation mode when the modulation modes in the set of candidate modulation modes are arranged in an ascending order, and L is the total number of the non-zero modulation modes in the set of candidate modulation modes.

By substituting formula (3') into the optimization target function (1) and using Lagrange multiplication, the optimal bit configuration can be derived:

$$b_k = \frac{1}{2}\log_2\left(\frac{\pi^2 g_k P_{total}}{B\gamma N}\right). \quad (4')$$

The estimation values of the numbers of bits for the sub-channels of the M-PSK modulation mode can be calculated according to the above mentioned formula (4').

Similarly, the estimation value $b_k$ can be quantized to a set of numbers of bits $\{0, a_1, a_2, \ldots, a_L\}$ corresponding to the set of candidate modulation modes, to obtain the numbers of bits for the sub-channels.

(The initialization of the number of bits in the case that the total capacity is given)

It is assumed that the transmission powers allocated to the sub-channels are $(P_1, P_2, \ldots, P_N)$, and the numbers of bits allocated to the sub-channels are $(b_1, b_2, \ldots, b_N)$. When the predetermined total capacity, i.e., the total number of bits $b_{total}$ for the system is given, an optimization target function for minimizing system power is:

$$\min \cdot \sum_{k=1}^{N} P_k \text{ s.t.} \sum_{k=1}^{N} b_k = b_{total}, \quad (5)$$

where k is the number of a sub-channel and 1≤k≤N, and N is the total number of the sub-channels. That is to say, when the system capacity is given, it is to minimize the total power.

For an M-QAM modulation mode, by using the relation between $P_k$ and $b_k$ given by the formula (3) in conjunction with the optimization target function (5), the optimal bit configuration can be derived using Lagrange multiplication:

$$b_k = \frac{b_{total}}{N} + \log_2 g_k - \frac{1}{N}\sum_{n=1}^{N}\log_2 g_n, \quad (6)$$

where $g_k$ is the normalized SNR on sub-channel k.

Similarly, the estimation value $b_k$ can be quantized to a set of numbers of bits $\{0, a_1, a_2, \ldots, a_L\}$ corresponding to the set of candidate modulation modes, to obtain the numbers of bits for the sub-channels.

For an M-PSK modulation mode, by using the relation between $P_k$ and $b_k$ given by the formula (3') in conjunction with the optimization target function (5), the optimal bit configuration can be derived using Lagrange multiplication:

$$b_k = \frac{b_{total}}{N} + \frac{1}{2}\log_2 g_k - \frac{1}{2N}\sum_{n=1}^{N}\log_2 g_n, \quad (6')$$

where $g_k$ is the normalized SNR on sub-channel k.

Similarly, the estimation value $b_k$ can be quantized to a set of numbers of bits $\{0, a_1, a_2, \ldots, a_L\}$ corresponding to the set of candidate modulation modes, so as to obtain the numbers of bits for the sub-channels.

In the bit initializing according to the embodiment of the present invention, the use of the target bit error rate $BER_{target}$ enables the initialized numbers of bits relatively more accurate, thus it is possible to reduce the number of times the iteration is performed in the adjustment of the numbers of bits and the powers.

Though the above method for bit and power allocation according to the embodiments of the present invention is described by taking M-QAM and M-PSK modulation modes as examples, it should be understood that the method according to the embodiments of the present invention has no limitation to the modulation modes due to the use of the SNR lookup table, and various modulation modes can be used. In addition, it should be understood that the sub-channels can use the same modulation mode or different modulation modes.

Figure 6:
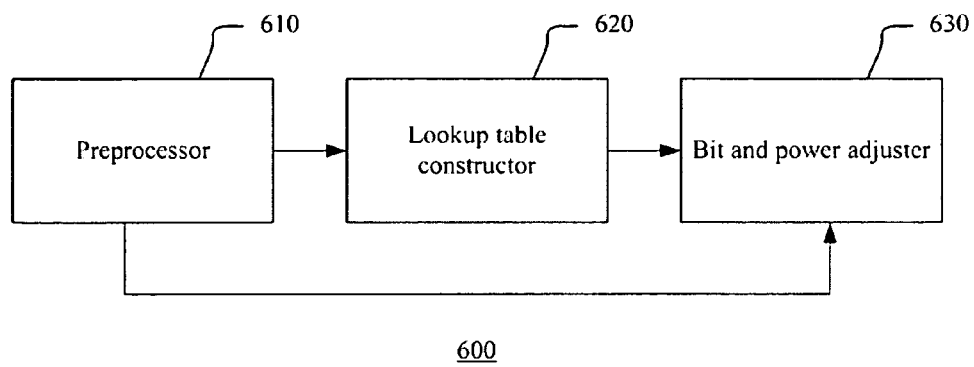
FIG. 6 shows a schematic block diagram of an apparatus for bit and power allocation according to an embodiment of the present invention.

FIG. 6 shows a schematic block diagram of an apparatus for bit and power allocation according to an embodiment of the present invention. As shown in FIG. 6, a bit and power allocator 600 comprises a preprocessor 610, a lookup table constructor 620 and a bit and power adjuster 630.

According to an embodiment of the present invention, the preprocessor 610 is configured to determine a set of candidate modulation modes for sub-channels, obtain normalized SNRs on the sub-channels, initialize the numbers of bits for the sub-channels, and initialize powers for the sub-channels according to the numbers of bits for the sub-channels, the normalized SNRs on the sub-channels and an SNR lookup table. The lookup table constructor 620 is configured to construct the SNR lookup table according to a predetermined BER, the SNR lookup table containing a relationship between an SNR and the number of bits corresponding to a modulation mode in the set of candidate modulation modes at the target BER. The bit and power adjuster 630 is configured to adjust the numbers of bits and the powers for the sub-channels in accordance with a principle of maximizing power utilization rate, in order to obtain the result of the bit and power allocation for the sub-channels.

According to another embodiment of the present invention, the preprocessor 610 is further configured to initialize backward power increments and forward power increments for the sub-channels, a backward power increment for a sub-channel indicating the amount by which the current power for the sub-channel is to be decreased when the next lower level of number of bits than the current number of bits for the sub-channel is allocated to the sub-channel, and a forward power increment for a sub-channel indicating the amount by which the current power for the sub-channel is to be increased when the next higher level of number of bits than the current number of bits for the sub-channel is allocated to the sub-channel. The bit and power adjuster 630 is further configured to, when the maximum one of the backward power increments for the sub-channels is larger than the minimum one of the forward power increments for the sub-channels other than the sub-channel having the maximum backward power increment, increase the number of bits for the sub-channel having the minimum forward power increment upward by one level, decrease the number of bits for the sub-channel having the maximum backward power increment downward by one level, and update the powers, the backward power increments and the forward power increments for the two sub-channels.

According to another embodiment of the present invention, the bit and power adjuster 630 is further configured to, when the maximum one of the backward power increments for the sub-channels is smaller than or equal to the minimum one of the forward power increments for the sub-channels other than the sub-channel having the maximum backward power increment, finely tune the numbers of bits and the powers for the sub-channels such that predetermined total power or predetermined capacity for the system is allocated to the sub-channels exactly.

According to another embodiment of the present invention, the bit and power adjuster 630 is further configured to, when the predetermined total power for the system is given, when a sum of the powers for all the sub-channels goes beyond the predetermined total power, decrease the number of bits for the sub-channel having the maximum backward power increment downward by one level, and update the power, the backward power increment and the forward power increment for the sub-channel; when the sum of the powers for all the sub-channels does not go beyond the predetermined total power and a difference of the predetermined total power and the sum is larger than or equal to the minimum forward power increment, increase the number of bits for the sub-channel having the minimum forward power increment upward by one level, and update the power, the backward power increment and the forward power increment for the sub-channel; and when the sum of the powers for all the sub-channels does not go beyond the predetermined total power and the difference of the predetermined total power and the sum is smaller than the minimum forward power increment, increase the power for each of the sub-channels by a multiple equal to the ratio of the predetermined total power and the sum.

According to another embodiment of the present invention, the bit and power adjuster 630 is further configured to, when the predetermined capacity for the system is given, when a sum of the numbers of bits for all the sub-channels goes beyond a predetermined total number of bits for the system, decrease the number of bits for the sub-channel having the maximum backward power increment downward by one level, and update the power, the backward power increment and the forward power increment for the sub-channel; and when the sum of the numbers of bits for all the sub-channels is lower than the predetermined total number of bits for the system, increase the number of bits for the sub-channel having the minimum forward power increment upward by one level, and update the power, the backward power increment and the forward power increment for the sub-channel.

The preprocessor 610 can initialize the numbers of bits in various known ways. The preprocessor 610 can also use the new method for initializing the numbers of bits as described above according to the embodiments of the present invention so as to allow the initialized numbers of bits relatively more accurate, thus further reducing the number of times of the subsequent iteration. The specific details will not be repeated here again.

The preprocessor 610 can also initialize powers for sub-channels by using the power initializing method as described above according to the embodiments of the present invention. The specific details will not be repeated here again.

The lookup table constructor 620 can calculate the elements in the SNR lookup table, i.e., SNRs, by using existing precise BER formulas in the prior art. In addition to the BER formulas in the prior art, the lookup table constructor 620 can also use the BER formulas as described above according to the embodiments of the present invention to calculate the SNRs in the SNR lookup table. The specific details will not be repeated here again.

Figure 7:
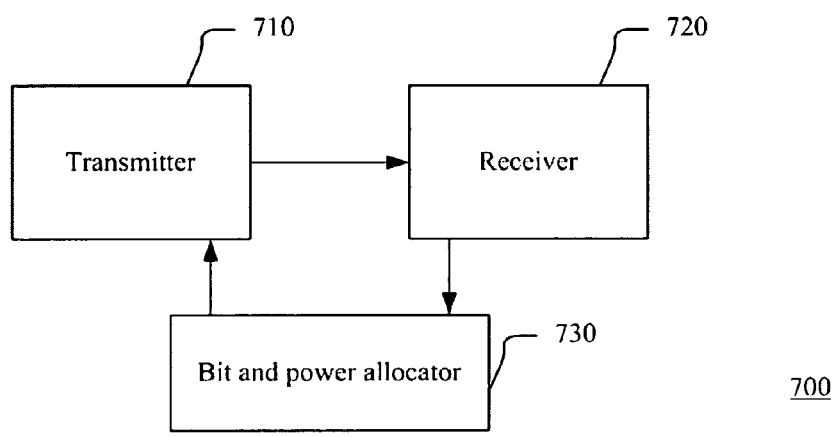
FIG. 7 shows a schematic block diagram of a communication system according to an embodiment of the present invention.

FIG. 7 shows a schematic block diagram of a communication system according to an embodiment of the present invention. As shown in FIG. 7, a communication system 700 comprises a transmitter 710, a receiver 720 and a bit and power allocation apparatus 730. The transmitter 710 is configured to modulate input data onto sub-channels, and transmit the data to the receiver via the sub-channels. The receiver 720 is configured to demodulate the sub-channels to obtain the data, and perform channel estimation on the sub-channels. The bit and power allocation apparatus 730 is configured to perform bit and power allocation for the sub-channels according to a result of the channel estimation performed by the receiver 720, and transmit a result of the allocation to the transmitter 710.

The bit and power allocator according to the embodiments of the present invention can be used as the bit and power allocation apparatus 730. The transmitter 710 and the receiver 720 can be identical to the transmitter and the receiver in a parallel communication system with multiple sub-channels in the prior art, respectively. For example, the transmitter 710 and the receiver 720 can be the transmitter 110 and the receiver 120 in the system 100 shown in FIG. 1, respectively.

The bit and power allocation apparatus 730 can be provided in the transmitter 710 or the receiver 720, and can also be provided individually as a separate apparatus.

Further details of the operations of the apparatus and system of the present invention can be found from the above embodiments of the method, and will not be detailed here.

The method and apparatus for bit and power allocation and the system according to the present invention construct an SNR lookup table according to a target BER, and at least perform power initialization based on the SNR lookup table, allowing the initialized powers relatively accurate and to reflect the system performance relatively precisely. Therefore it is possible to reduce the number of times the iteration is performed in the adjustment of the numbers of bits and powers. Since the SNR lookup table is constructed in advance, the calculation load for the subsequent adjustment of the numbers of bits and the powers can be decreased.

In addition, due to the construction of the SNR lookup table, the method, and apparatus and the system of the present invention have no limitation to the modulation modes of the sub-channels.

The method and apparatus for bit and power allocation and the system according to the present invention can be applied to a parallel communication system with multiple sub-channels, such as a multicarrier system like OFDM or DMT, an MIMO system and an FDM system, etc.

In addition, the constituent modules and units of the above mentioned apparatuses according to the embodiments of the present invention can be configured by way of software, firmware, hardware or the combination thereof. The specific means or manners available for the configuration are well known by those skilled in the art, and will not be described here. In the case that the constituent modules and units are implemented by way of software or firmware, a program constituting the software is loaded from a storage medium or a network to a computer having a dedicated hardware structure (such as the general purpose computer 800 shown in FIG. 8). The computer, when loaded with various programs, can execute various functions.

Figure 8:
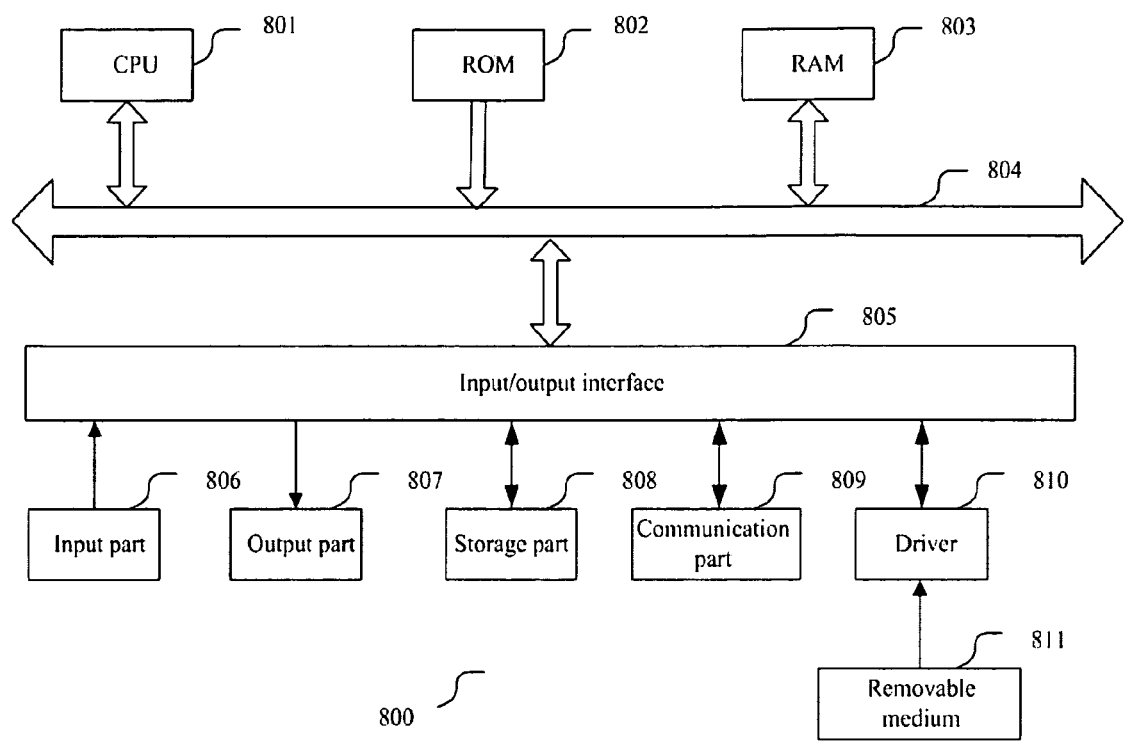
FIG. 8 shows a schematic block diagram of a computer that can be used to implement the method, apparatus and system according to the embodiments of the present invention.

In FIG. 8, a central processing unit (CPU) 801 executes various processes according to programs stored in a read-only memory (ROM) 802 or programs loaded from a storage part 808 to a random access memory (RAM) 803. Data needed when the CPU 801 executes various processes are also stored in the RAM 803 as required. The CPU 801, the ROM 802 and the RAM 803 are connected with each other via a bus 804. An input/output interface 805 is also connected to the bus 804.

The following components are connected to the input/output interface 805: an input part 806 (including a keyboard, a mouse and etc.), an output part 807 (including a display such as a cathode-ray tube (CRT) or a liquid crystal display (LCD), and a speaker, etc.), the storage part 808 (including a hard disk, etc.), and a communication part 809 (including a network interface card such as an LAN card, a MODEM and etc.). The communication part 809 executes communication processing via a network such as the Internet. A driver 810 may also be connected to the input/output interface 805 as required. A removable medium 811 such as a magnetic disk, an optical disk, a magneto-optical disk or a semiconductor memory can be installed on the driver 810 as required, such that the computer program read out therefrom is loaded into the storage part 808 as required.

In the case that the above series of processes are implemented by software, a program constituting the software is loaded from a network such as the Internet or from a storage medium such as a removable medium 811.

It is to be understood by those skilled in the art that this kind of storage medium is not limited to the removable medium 811 storing programs therein and distributing the programs to a user(s) dependently from a device. Examples of the removable medium 811 include a magnetic disk (including a Floppy Disk (FD) (registered trademark)), an optical disk (including a Compact Disk-Read Only Memory (CD-ROM) and a Digital Versatile Disc (DVD)), a magneto-optical disk (including Microdisk (MD) (registered trademark)) and a semiconductor memory. Alternatively, the storage medium can be the ROM 802, a hard disk contained in the storage part 808, etc., in which programs are stored and which is distributed to a user(s) along with a device the storage medium is contained in.

The present invention further provides a program product storing machine-readable instruction codes. The instruction codes, when read and executed by a machine, can execute the methods according to the embodiments of the present invention.

Correspondingly, the storage medium for carrying the program product storing machine-readable instruction codes is also incorporated in the disclosure of the present invention. The storage medium includes, but is not limited to, a flexible disk, an optical disk, a magneto-optical disk, a storage card and a storage stick.

In the above description of the specific embodiments of the present invention, features described and/or illustrated with respect to one embodiment can be used in one or more other embodiments in an identical or similar manner, be combined with features in other embodiments, or replace features in other embodiments.

It is to be emphasized that, the term "comprise/include", as used in the present description, refers to the presence of features, elements, steps or components, but does not exclude the presence or addition of one or more other features, elements, steps or components.

In addition, the methods of the present invention are not limited to being executed in the chronological orders as described in the specification, but can also be executed in other chronological order, in parallel or separately. Therefore, the execution orders of the methods described in the present specification do not constitute limitations to the technical scope of the present invention.

While the present invention is disclosed with reference to descriptions for the specific embodiments of the present invention, it is understood that all of the above mentioned embodiments and examples are illustrative instead of limiting. Those skilled in the art can devise various modifications, improvements or equivalents for the present invention, within the spirit and scope of the appended claims. The modifications, improvements or equivalents should also be considered as being included in the protection scope of the present invention.

What is claimed is:

1. A method for bit and power allocation, comprising:
determining a set of candidate modulation modes for sub-channels;
constructing a signal-to-noise ratio (SNR) lookup table according to a predetermined target bit error rate (BER), the SNR lookup table containing a relationship of an SNR and the number of bits corresponding to a modulation mode in the set of candidate modulation modes at the predetermined target BER;
obtaining normalized SNRs on the sub-channels;
initializing the numbers of bits for the sub-channels;
initializing powers for the sub-channels according to the numbers of bits for the sub-channels, the normalized SNRs on the sub-channels and the SNR lookup table; and
adjusting the numbers of bits and the powers for the sub-channels in accordance with a principle of maximizing power utilization rate, the adjusted numbers of bits and powers for the sub-channels being taken as a result of bit and power allocation for the sub-channels, wherein for an M-QAM modulation mode, the SNR lookup table is constructed with BER calculation formulas of $$SNR=[erfc^{-1}(2BER_{target})]^2 \text{ when the number of bits is 1;}$$

$$SNR = (3+\sqrt{3})\left[erfc^{-1}\left(\frac{16}{11}BER_{target}\right)\right]^2 \text{ or}$$

$$SNR = 6\left[erfc^{-1}\left(\frac{12}{5}BER_{target}\right)\right]^2$$

when the number of bits is 3;

$$SNR = \frac{2}{3}(2^{2p}-1)\left[erfc^{-1}\left(\frac{2^{p+1}p}{2(2^p-1)}BER_{target}\right)\right]^2$$

when the number of bits is 2p and p is a positive integer; and $$SNR = \left(\frac{31}{48}2^{2p+1}-\frac{2}{3}\right)\left[erfc^{-1}\left(\frac{2^{p+1}(2p+1)}{2(2^{p+1}-1)}BER_{target}\right)\right]^2$$

when the number of bits is 2p+1, p is a positive integer and p≥2, wherein $BER_{target}$ is the predetermined target BER, wherein for an M-PSK modulation mode, the SNR lookup table is constructed with BER calculation formulas of $$SNR=[erfc^{-1}(2BER_{target})]^2 \text{ when the number of bits is 1;}$$

$$SNR=2[erfc^{-1}(2BER_{target})]^2 \text{ when the number of bits is 2; and}$$

$$SNR = \left[erfc^{-1}(pBER_{target})/\sin\left(\frac{\pi}{2^p}\right)\right]^2$$

when the number of bits is p, p is a positive integer and p≥3, wherein $BER_{target}$ is the predetermined target BER.

2. The method according to claim 1, further comprising:

initializing backward power increments and forward power increments for the sub-channels, a backward power increment for a sub-channel indicating the amount by which the current power for the sub-channel is to be decreased when the next lower level of number of bits than the current number of bits for the sub-channel is allocated to the sub-channel, and a forward power increment for a sub-channel indicating the amount by which the current power for the sub-channel is to be increased when the next higher level of number of bits than the current number of bits for the sub-channel is allocated to the sub-channel, wherein the adjusting the numbers of bits and the powers for the sub-channels in accordance with a principle of maximizing power utilization rate comprises:

if the maximum one of the backward power increments for the sub-channels is larger than the minimum one of the forward power increments for the sub-channels other than one of the sub-channels that has the maximum backward power increment, increasing the number of bits for another one of the sub-channels that has the minimum forward power increment upward by one level, decreasing the number of bits for the one of the sub-channels that has the maximum backward power increment downward by one level, updating the powers, the backward power increments and the forward power increments for the one of the sub-channels and the another one of the sub-channels, and continuing to perform the adjusting the numbers of bits and the powers for the sub-channels in accordance with a principle of maximizing power utilization rate.

3. The method according to claim 2, wherein the adjusting the numbers of bits and the powers for the sub-channels further comprises:

if the maximum one of the backward power increments for the sub-channels is smaller than or equal to the minimum one of the forward power increments for the sub-channels other than the one of the sub-channels that has the maximum backward power increment, finely tuning the numbers of bits and the powers for all the sub-channels such that predetermined total power or predetermined capacity for a system is allocated to the sub-channels exactly.

4. The method according to claim 3, wherein when the predetermined total power for the system is set, the finely tuning comprises:

when a sum of the powers for all the sub-channels goes beyond the predetermined total power, decreasing the number of bits for the one of the sub-channels that has the maximum backward power increment downward by one level, updating the power, the backward power increment and the forward power increment for the one of the sub-channels, and continuing to perform the finely tuning;

when the sum of the powers for all the sub-channels does not go beyond the predetermined total power and a difference of the predetermined total power and the sum of the powers for all the sub-channels is larger than or equal to the minimum forward power increment, increasing the number of bits for the another one of the sub-channels that has the minimum forward power increment upward by one level, updating the power, the backward power increment and the forward power increment for the another one of the sub-channels, and continuing to perform the finely tuning; and when the sum of the powers for all the sub-channels does not go beyond the predetermined total power and the difference of the predetermined total power and the sum of the powers for all the sub-channels is smaller than the minimum forward power increment, increasing the power for each of all the sub-channels by a multiple equal to the ratio of the predetermined total power and the sum of the powers for all the sub-channels.

5. The method according to claim 4, wherein the initializing the numbers of bits for the sub-channels comprises:

calculating estimation values of the numbers of bits for the sub-channels in M-QAM modulation mode with a formula of $$b_k = \log_2\left(\frac{1.5 g_k P_{total}}{B\gamma N} + \frac{g_k}{N}\sum_{n=1}^{N}\frac{1}{g_n}\right),$$

wherein B is any one of the expressions of $$[\text{erfc}^{-1}(BER_{target}a_1/2)]^2, \frac{1}{L}\sum_{k=1}^{L}[\text{erfc}^{-1}(BER_{target}a_k/2)]^2$$

or $$\left[\frac{1}{L}\sum_{k=1}^{L}\text{erfc}^{-1}(BER_{target}a_k/2)\right]^2,$$

and
  wherein k is the number of a sub-channel and 1≤k≤N is the total number of the sub-channels, $g_k$ is a normalized SNR on the $k^{th}$ sub-channel, $g_n$ is a normalized SNR on the $n^{th}$ sub-channel, $P_{total}$ is the predetermined total power, γ is a predetermined power margin, $BER_{target}$ is the predetermined target BER, $a_1$ is the number of bits corresponding to a non-zero modulation mode having the lowest level in the set of candidate modulation modes, $a_k$ is the number of bits corresponding to the $k^{th}$ non-zero modulation mode in the set of modulation modes when the set of modulation modes are arranged in ascending order, and L is the total number of non-zero modulation modes in the set of modulation modes; and
  quantizing the estimation values of the numbers of bits for the sub-channels to obtain the numbers of bits for the sub-channels.

6. The method according to claim 4, wherein the initializing the numbers of bits for the sub-channels comprises:
  calculating estimation values of the numbers of bits for the sub-channels in M-PSK modulation mode with a formula of $$b_k = \frac{1}{2}\log_2\left(\frac{\pi^2 g_k P_{total}}{B\gamma N}\right),$$

wherein B is any one of the expressions of $$[\text{erfc}^{-1}(BER_{target}a_1)]^2, \frac{1}{L}\sum_{k=1}^{L}[\text{erfc}^{-1}(BER_{target}a_k)]^2$$

or $$\left[\frac{1}{L}\sum_{k=1}^{L}\text{erfc}^{-1}(BER_{target}a_k)\right]^2,$$

and
  wherein k is the number of a sub-channel and 1≤k≤N is the total number of the sub-channels, $g_k$ is a normalized SNR on the $k^{th}$ sub-channel, $P_{total}$ is the predetermined total power, γ is a predetermined power margin, $BER_{target}$ is the predetermined target BER, $a_1$ is the number of bits corresponding to a non-zero modulation mode having the lowest level in the set of candidate modulation modes, $a_k$ is the number of bits corresponding to the $k^{th}$ non-zero modulation mode in the set of modulation modes when the set of modulation modes are arranged in ascending order, and L is the total number of non-zero modulation modes in the set of modulation modes; and
  quantizing the estimation values of the numbers of bits for the sub-channels to obtain the numbers of bits for the sub-channels.

7. The method according to claim 3, wherein when the predetermined capacity for the system is set, the finely tuning comprises:
  when a sum of the numbers of bits for all the sub-channels goes beyond a predetermined total number of bits for the system, decreasing the number of bits for the one of the sub-channels that has the maximum backward power increment downward by one level, updating the power, the backward power increment and the forward power increment for the one of the sub-channels, and continuing to perform the finely tuning; and
  when the sum of the numbers of bits for all the sub-channels is lower than the predetermined total number of bits for the system, increasing the number of bits for the another one of the sub-channels that has the minimum forward power increment upward by one level, updating the power, the backward power increment and the forward power increment for the another one of the sub-channels, and continuing to perform the finely tuning.

8. The method according to claim 7, wherein the initializing the numbers of bits for the sub-channels comprises:
  calculating estimation values of the numbers of bits for the sub-channels in M-QAM modulation mode with a formula of $$b_k = \frac{b_{total}}{N} + \log_2 g_k - \frac{1}{N}\sum_{n=1}^{N}\log_2 g_n,$$

wherein k is the number of a sub-channel and 1≤k≤N is the total number of the sub-channels, $g_k$ is a normalized SNR on the $k^{th}$ sub-channel, $g_n$ is a normalized SNR on the $n^{th}$ sub-channel, and $b_{total}$ is the predetermined total number of bits; and
  quantizing the estimation values of the numbers of bits for the sub-channels to obtain the numbers of bits for the sub-channels.

9. The method according to claim 7, wherein the initializing the numbers of bits for the sub-channels comprises:
  calculating estimation values of the numbers of bits for the sub-channels in M-PSK modulation mode with a formula of $$b_k = \frac{b_{total}}{N} + \frac{1}{2}\log_2 g_k - \frac{1}{2N}\sum_{n=1}^{N}\log_2 g_n,$$

wherein k is the number of a sub-channel and 1≤k≤N is the total number of the sub-channels, $g_k$ is a normalized SNR on the $k^{th}$ sub-channel, $g_n$ is a normalized SNR on the $n^{th}$ sub-channel, and $b_{total}$ is the predetermined total number of bits; and
  quantizing the estimation values of the numbers of bits for the sub-channels to obtain the numbers of bits for the sub-channels.

10. The method according to claim 1, wherein the initializing the powers for the sub-channels according to the numbers of bits for the sub-channels comprises:
  obtaining SNRs corresponding to the numbers of bits for the sub-channels by looking up the SNR lookup table, as the SNRs on the sub-channels; and calculating the powers for the sub-channels according to the SNRs and the normalized SNRs on the sub-channels by using the formula of $$P_k(b_k)=SNR(b_k)/\gamma g_k,$$

wherein k is the number of a sub-channel and $1 \leq k \leq N$ is the total number of the sub-channels, $g_k$ is a normalized SNR on the $k^{th}$ sub-channel, and $\gamma$ is a predetermined power margin.

11. An apparatus for bit and power allocation, comprising:
a preprocessor to determine a set of candidate modulation modes for sub-channels, obtain normalized signal-to-noise ratios (SNRs) on the sub-channels, initialize the numbers of bits for the sub-channels, and initialize powers for the sub-channels according to the numbers of bits for the sub-channels, the normalized SNRs on the sub-channels and an SNR lookup table;

a lookup table constructor to construct the SNR lookup table according to a predetermined target bit error rate (BER), the SNR lookup table containing a relationship of an SNR and the number of bits corresponding to a modulation mode in the set of candidate modulation modes at the predetermined target BER; and a bit and power adjuster to adjust the numbers of bits and the powers for the sub-channels in accordance with a principle of maximizing power utilization rate, the adjusted numbers of bits and powers for the sub-channels being taken as a result of bit and power allocation for the sub-channels, wherein the lookup table constructor to, for an M-QAM modulation mode, construct the SNR lookup table with BER calculation formulas of $SNR=[erfc^{-1}(2BER_{target})]^2$ when the number of bits is 1;

$$SNR = (3+\sqrt{3})\left[erfc^{-1}\left(\frac{16}{11}BER_{target}\right)\right]^2 \text{ or}$$

$$SNR = 6\left[erfc^{-1}\left(\frac{12}{5}BER_{target}\right)\right]^2$$

when the number of bits is 3;

$$SNR = \frac{2}{3}(2^{2p}-1)\left[erfc^{-1}\left(\frac{2^{p+1}p}{2(2^p-1)}BER_{target}\right)\right]^2$$

when the number of bits is 2p and p is a positive integer; and $$SNR = \left(\frac{31}{48}2^{2p+1}-\frac{2}{3}\right)\left[erfc^{-1}\left(\frac{2^{p+1}(2p+1)}{2(2^{p+1}-1)}BER_{target}\right)\right]^2$$

when the number of bits is 2p+1, p is a positive integer and $p \geq 2$,
wherein $BER_{target}$ is the predetermined target BER, wherein the lookup table constructor to, for an M-PSK modulation mode, construct the SNR lookup table with BER calculation formulas of $SNR=[erfc^{-1}(2BER_{target})]^2$ when the number of bits is 1;

$SNR=2[erfc^{-1}(2BER_{target})]^2$ when the number of bits is 2; and $$SNR = \left[erfc^{-1}(pBER_{target})/\sin\left(\frac{\pi}{2p}\right)\right]^2$$

when the number of bits is p, p is a positive integer and $p \geq 3$, wherein $BER_{target}$ is the predetermined target BER.

12. The apparatus according to claim 11, wherein
the preprocessor to initialize backward power increments and forward power increments for the sub-channels, a backward power increment for a sub-channel indicating the amount by which the current power for the sub-channel is to be decreased when the next lower level of number of bits than the current number of bits for the sub-channel is allocated to the sub-channel, and a forward power increment for a sub-channel indicating the amount by which the current power for the sub-channel is to be increased when the next higher level of number of bits than the current number of bits for the sub-channel is allocated to the sub-channel, and
the bit and power adjuster to, if the maximum one of the backward power increments for the sub-channels is larger than the minimum one of the forward power increments for the sub-channels other than one of the sub-channels that has the maximum backward power increment, increase the number of bits for another one of the sub-channels that has the minimum forward power increment upward by one level, decrease the number of bits for the one of the sub-channels that has the maximum backward power increment downward by one level, and update the powers, the backward power increments and the forward power increments for the one of the sub-channels and the another one of the sub-channels.

13. The apparatus according to claim 12, wherein the bit and power adjuster to, if the maximum one of the backward power increments for the sub-channels is smaller than or equal to the minimum one of the forward power increments for the sub-channels other than the one of the sub-channels that has the maximum backward power increment, finely tuning the numbers of bits and the powers for the sub-channels such that predetermined total power or predetermined capacity for a system is allocated to the sub-channels exactly.

14. The apparatus according to claim 13, wherein the bit and power adjuster to, in the case that the predetermined total power for the system is set,
when a sum of the powers for all the sub-channels goes beyond the predetermined total power, decrease the number of bits for the one of the sub-channels that has the maximum backward power increment downward by one level, and update the power, the backward power increment and the forward power increment for the one of the sub-channels;
when the sum of the powers for all the sub-channels does not go beyond the predetermined total power and a difference of the predetermined total power and the sum of the powers for all the sub-channels is larger than or equal to the minimum forward power increment, increase the number of bits for the another one of the sub-channels that has the minimum forward power increment upward by one level, and update the power, the backward power increment and the forward power increment for the another one of the sub-channels; and when the sum of the powers for all the sub-channels does not go beyond the predetermined total power and the difference of the predetermined total power and the sum of the powers for all the sub-channels is smaller than the minimum forward power increment, increase the power for each of all the sub-channels by a multiple equal to the ratio of the predetermined total power and the sum of the powers for all the sub-channels.

15. The apparatus according to claim 14, wherein the bit and power adjuster to, in the case that the predetermined capacity for the system is set, when a sum of the numbers of bits for all the sub-channels goes beyond a predetermined total number of bits for the system, decrease the number of bits for the one of the sub-channels that has the maximum backward power increment downward by one level, and update the power, the backward power increment and the forward power increment for the one of the sub-channels; and when the sum of the numbers of bits for all the sub-channels is lower than the predetermined total number of bits for the system, increase the number of bits for the another one of the sub-channels that has the minimum forward power increment upward by one level, and update the power, the backward power increment and the forward power increment for the another one of the sub-channels.

16. A communication system, comprising:

a transmitter to modulate input data onto sub-channels, and transmit the data to a receiver via the sub-channels;

the receiver to demodulate the sub-channels to obtain the data, and perform channel estimation on the sub-channels; and a bit and power allocator to perform bit and power allocation for the sub-channels according to a result of the channel estimation and transmit a result of the allocation to the transmitter, wherein the bit and power allocator comprises:

a preprocessor to determine a set of candidate modulation modes for the sub-channels, obtain normalized signal-to-noise ratios (SNRs) on the sub-channels, initialize the numbers of bits for the sub-channels, and initialize powers for the sub-channels according to the numbers of bits for the sub-channels, the normalized SNRs on the sub-channels and an SNR lookup table;

a lookup table constructor to construct the SNR lookup table according to a predetermined target bit error rate (BER), the SNR lookup table containing a relationship of an SNR and the number of bits corresponding to a modulation mode in the set of candidate modulation modes at the predetermined target BER; and a bit and power adjuster to adjust the numbers of bits and the powers for the sub-channels in accordance with a principle of maximizing power utilization rate, in order to obtain the result of the bit and power allocation for the sub-channels, wherein the lookup table constructor to, for an M-QAM modulation mode, construct the SNR lookup table with BER calculation formulas of $SNR=[erfc^{-1}(2BER_{target})]^2$ when the number of bits is 1;

$$SNR = (3+\sqrt{3})\left[erfc^{-1}\left(\frac{16}{11}BER_{target}\right)\right]^2$$

or $$SNR = 6\left[erfc^{-1}\left(\frac{12}{5}BER_{target}\right)\right]^2$$

when the number of bits is 3;

$$SNR = \frac{2}{3}(2^{2p}-1)\left[erfc^{-1}\left(\frac{2^{p+1}}{2(2^p-1)}BER_{target}\right)\right]^2$$

when the number of bits is 2p and p is a positive integer; and $$SNR = \left(\frac{31}{48}2^{2p+1} - \frac{2}{3}\right)\left[erfc^{-1}\left(\frac{2^{p+1}(2p+1)}{2(2^{p+1}-1)}BER_{target}\right)\right]^2$$

when the number of bits is 2p+1, p is a positive integer and p≥2, wherein $BER_{target}$ is the predetermined target BER, wherein the lookup table constructor to, for an M-PSK modulation mode, construct the SNR lookup table with BER calculation formulas of $SNR=[erfc^{-1}(2BER_{target})]^2$ when the number of bits is 1;

$SNR=2[erfc^{-1}(2BER_{target})]^2$ when the number of bits is 2; and $$SNR = \left[erfc^{-1}(pBER_{target})/\sin\left(\frac{\pi}{2^p}\right)\right]^2$$

when the number of bits is p, p is a positive integer and p≥3, wherein $BER_{target}$ is the predetermined target BER.

17. The communication system according to claim 16, wherein the preprocessor to initialize backward power increments and forward power increments for the sub-channels, a backward power increment for a sub-channel indicating the amount by which the current power for the sub-channel is to be decreased when the next lower level of number of bits than the current number of bits for the sub-channel is allocated to the sub-channel, and a forward power increment for a sub-channel indicating the amount by which the current power for the sub-channel is to be increased when the next higher level of number of bits than the current number of bits for the sub-channel is allocated to the sub-channel, and the bit and power adjuster to, if the maximum one of the backward power increments for the sub-channels is larger than the minimum one of the forward power increments for the sub-channels other than one of the sub-channels that has the maximum backward power increment, increase the number of bits for another one of the sub-channels that has the minimum forward power increment upward by one level, decrease the number of bits for the one of the sub-channels that has the maximum backward power increment downward by one level, and update the powers, the backward power increments and the forward power increments for the one of the sub-channels and the another one of the sub-channels.

18. The communication system according to claim 17, wherein the bit and power adjuster to, if the maximum one of the backward power increments for the sub-channels is smaller than or equal to the minimum one of the forward power increments for the sub-channels other than the one of the sub-channels that has the maximum backward power increment, finely tuning the numbers of bits and the powers for all the sub-channels such that predetermined total power or predetermined capacity for a system is allocated to the sub-channels exactly.

19. The communication system according to claim 18, wherein the bit and power adjuster to, in the case that the predetermined total power for the system is set, when a sum of the powers for all the sub-channels goes beyond the predetermined total power, decrease the number of bits for the one of the sub-channels that has the maximum backward power increment downward by one level, and update the power, the backward power increment and the forward power increment for one of the sub-channels;

when the sum of the powers for all the sub-channels does not go beyond the predetermined total power and a difference of the predetermined total power and the sum of the powers for all the sub-channels is larger than or equal to the minimum forward power increment, increase the number of bits for the another one of the sub-channels that has the minimum forward power increment upward by one level, and update the power, the backward power increment and the forward power increment for the another one of the sub-channels; and when the sum of the powers for all the sub-channels does not go beyond the predetermined total power and the difference of the predetermined total power and the sum of the powers for all the sub-channels is smaller than the minimum forward power increment, increase the power for each of all the sub-channels by a multiple equal to the ratio of the predetermined total power and the sum of the powers for all the sub-channels.

20. The communication system according to claim 19, wherein the bit and power adjuster to, in the case that the predetermined capacity for the system is set, when a sum of the numbers of bits for all the sub-channels goes beyond a predetermined total number of bits for the system, decrease the number of bits for the one of the sub-channels that has the maximum backward power increment downward by one level, and update the power, the backward power increment and the forward power increment for the one of the sub-channels; and when the sum of the numbers of bits for all the sub-channels is lower than the predetermined total number of bits for the system, increase the number of bits for the another one of the sub-channels that has the minimum forward power increment upward by one level, and update the power, the backward power increment and the forward power increment for the another one of the sub-channels.

* * * * *